R. B. HITCHCOCK.
THRESHER.
APPLICATION FILED NOV. 19, 1914.

1,261,813.

Patented Apr. 9, 1918.
2 SHEETS—SHEET 2.

Witnesses:

Inventor:
Rex B. Hitchcock,
By Chas. E. Lord
Atty.

UNITED STATES PATENT OFFICE.

REX B. HITCHCOCK, OF OAK PARK, ILLINOIS, ASSIGNOR TO INTERNATIONAL HARVESTER COMPANY OF NEW JERSEY, A CORPORATION OF NEW JERSEY.

THRESHER.

1,261,813.  Specification of Letters Patent.  Patented Apr. 9, 1918.

Application filed November 19, 1914. Serial No. 872,888.

*To all whom it may concern:*

Be it known that I, REX B. HITCHCOCK, a citizen of the United States, residing at Oak Park, in the county of Cook and State of Illinois, have invented certain new and useful Improvements in Threshers, of which the following is a full, clear, and exact specification.

My invention relates to threshers, and more particularly to combined harvesters and threshers.

It has among its objects to improve the manner of carrying away and delivering to the separator the grain threshed by the threshing mechanism of such machines. A further object of my invention is to improve the manner in which the straw threshed by such threshing mechanism is carried away therefrom. More specifically, my invention has among its objects to carry away both the grain and the straw from the threshing mechanism in such an improved manner that a more compact construction is provided and the distance of grain travel is materially reduced. Other objects and advantages of my invention will hereinafter appear.

I attain these objects by providing an improved grain, straw, or grain and straw, conveyer operatively associated with the threshing mechanism in an improved manner and movable with respect thereto, all as hereinafter more fully brought out.

In order that my invention may be completely and clearly disclosed, I have illustrated herein one embodiment which the same may assume in practice, showing the same used in connection with a harvester thresher.

In these drawings—

Figure 1:
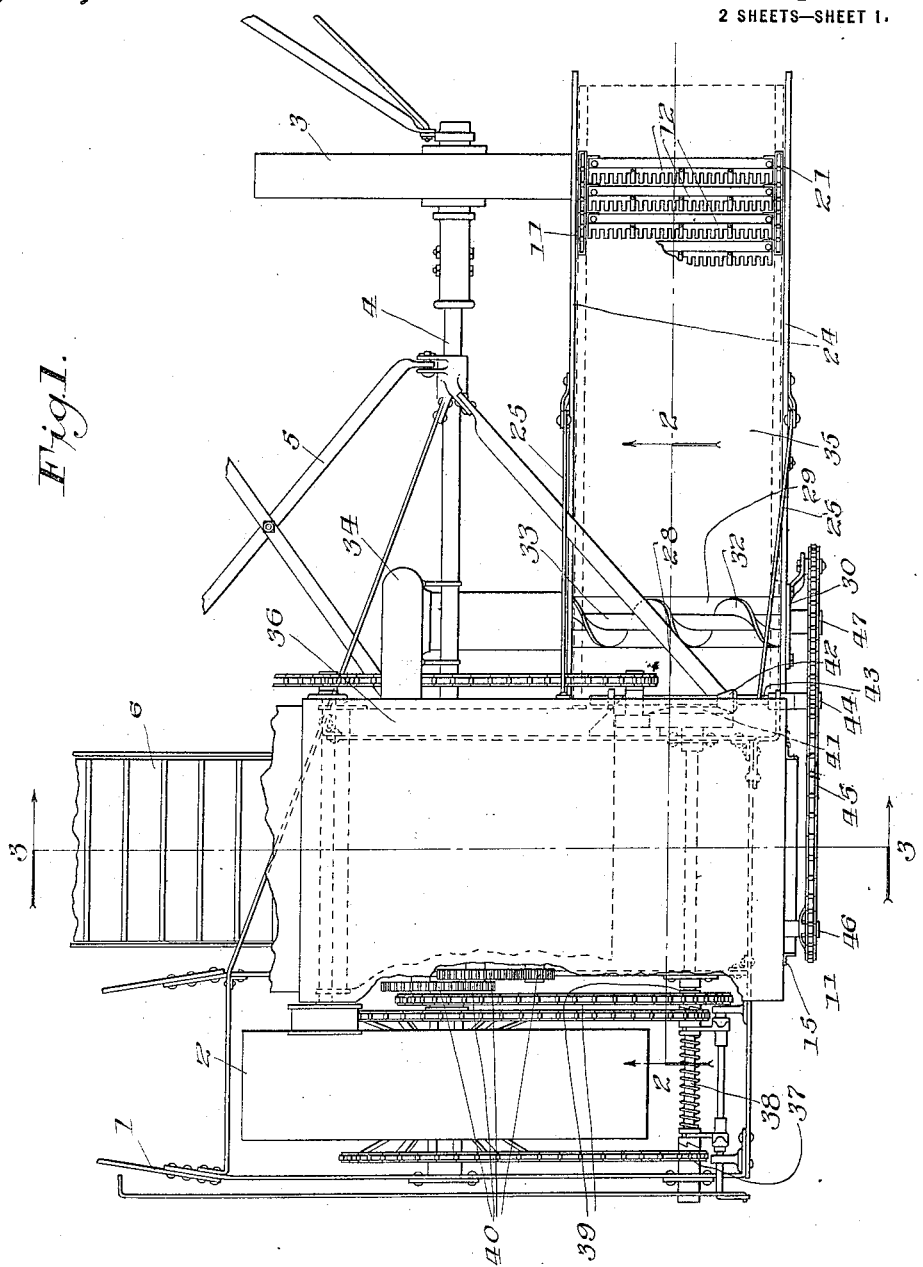
Figure 1 is a partial plan view of a harvester and thresher equipped with my improvement.

As shown in the drawings, this machine comprises a main frame 1 carried upon a main wheel 2, a grain wheel 3 and an axle 4, and provided with a swinging front frame 5 carrying suitable grain harvesting mechanism, not shown, which delivers the cut grain to a rearwardly moving conveyer 6, which in turn delivers it to a threshing cylinder 7, journaled on the frame 1 in a casing 8, and having its axis disposed transversely to the line of draft.

Figure 2:
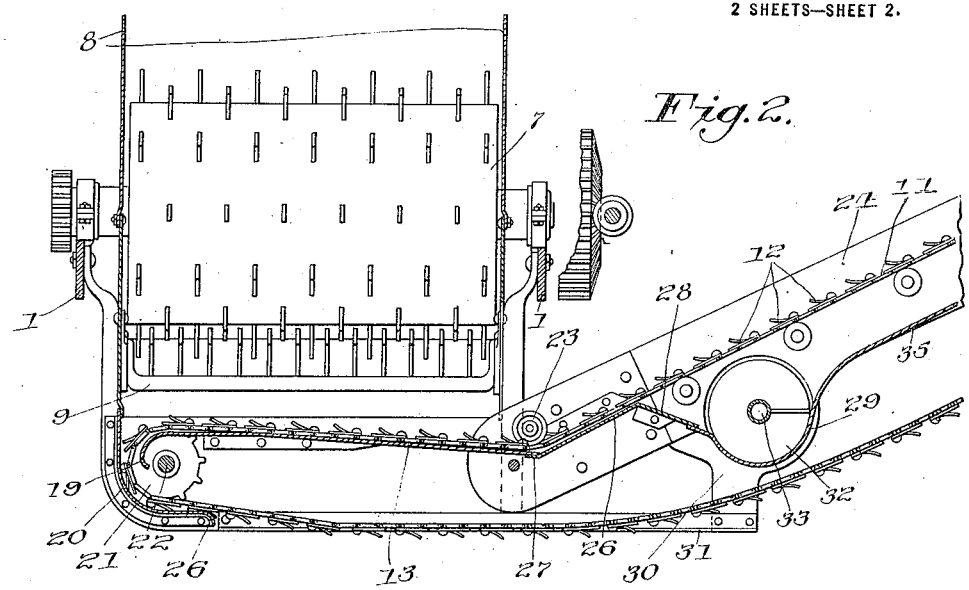
Fig. 2 is a transverse sectional view taken on line 2—2 of Fig. 1.
Figure 3:
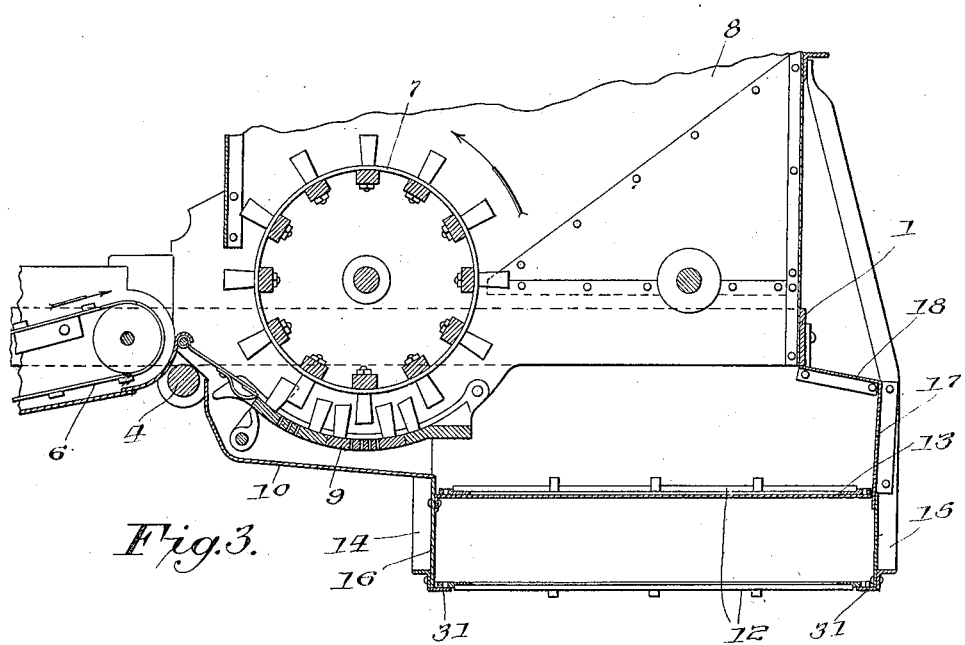
Fig. 3 is a longitudinal sectional view taken on line 3—3 of Fig. 1.

In my improvement the grain and straw threshed by the cylinder 7 and its coöperating concave 9 is delivered by the cylinder itself or a coöperating rearwardly, and preferably downwardly, disposed chute 10, located beneath the concave, upon a grain and straw conveyer 11, preferably of the endless type and transversely movable, the majority of the grain and straw falling directly upon the conveyer or striking the rear wall of the casing 8 and then falling upon the conveyer, while that portion of the grain which falls through the concave is delivered to the conveyer by the chute 10. This conveyer may be of any other desired construction which permits the grain to fall therethrough, and as shown is provided with flexibly connected grain and straw carrying members, illustrated herein as slats 12. As shown in Figs. 2 and 3, it is located at a point in rear and preferably beneath the cylinder 7, moving over a floor 13 disposed substantially horizontal with respect to the ground though sloping slightly toward its grainward end. This floor is supported on the frame 1 of the machine by suitable U-shaped, transversely disposed, spaced supports 14 and 15 and end plates 16, 17, an upper plate 18 bridging the interval between the rear wall of the casing 8 and the end plate 17 at a point above the latter. As illustrated in Fig. 2, this floor 13 is also provided with a downturned stubbleward end 19 protruding to a point adjacent the downwardly and grainwardly curved stubbleward wall 20 of the casing 10, and the conveyer 11 is mounted on suitable spaced sprockets 21 (only one of which is shown) carried on a longitudinally disposed shaft 22 journaled in the plates 16, 17 in such a manner that this conveyer may move between the curved end 19 of the floor and the curved end wall 20 of the casing, passing up at the stubbleward end of the floor and over the latter in a grainward direction, with the slats thereof dragging grainward over the floor 13, any grain falling down through the conveyer.
At a point adjacent the grainward end of the cylinder 7, and in rear of the latter, the conveyer 11 is shown to be turned upward or inclined with respect to the horizontal by any suitable means; such, for instance, as rollers 23, journaled on the lower or stubbleward end of an inclined conveyer box or casing 24, in which the outer end of the conveyer is carried on suitable sprockets corresponding to the sprockets 21, these rollers also acting to maintain the conveyer in operative relation to the floor 13. As shown, this conveyer box 24 is itself braced on the main frame by braces 25. Extending beneath the conveyer, as it moves off the floor 13 and upward in the box 24, is a floor extension 26 having a lip 27 underlying the grainward end of the floor 13 and provided at its other grainward end with a downturned inclined lip or extension 28 leading to and overlapping the edge of a longitudinally disposed conveyer casing 29 disposed between the upper and lower runs of the conveyer and carried on an upstanding bracket 30, itself supported on a grainwardly extending support 31 projecting beneath the floor 13. In this casing a grain conveyer or auger 32 is rotatably carried and connected to a shaft 33 in such a manner that, upon rotation of the shaft, it feeds longitudinally of the machine to an elevator 34 both the grain delivered thereto by the conveyer over the the floor extension 26, 28, and that falling through the conveyer and delivered to the auger 32 by a coöperating oppositely disposed floor 35 provided in the inclined conveyer box 24 beneath the upper end of the conveyer 11. This elevator 34 delivers the grain fed forward by the auger 32 to a separator 36 disposed above the cylinder and not shown herein in detail.

The power connections for all of the mechanism herein illustrated are connected to the main wheel 2 through any suitable mechanism; as, for instance, by chain and sprocket connections 37 connected between the main wheel and a rear power shaft 38. This power shaft 38 is in turn connected with the cylinder 7 through coöperating chain and sprocket connections 39 and gearing 40, and, as shown, is also connected with the conveyer operating mechanism through a beveled gear 41 and a coöperating beveled gear 42 mounted on a longitudinally disposed shaft 43 carrying at its rear end a sprocket 44 driving a transversely disposed rear power chain 45. This chain 45 passes over a sprocket 46 on the rear end of the conveyer shaft 22, as well as a sprocket 47 on the rear end of the grain auger shaft 33, and thus not only acts as the propelling means for both the conveyer 11 and the grain auger 32, but also provides power for the elevator mechanism 34, the latter being driven in a well-known manner from the shaft 33.

The operation of the mechanism is as follows: When the cylinder 7 is rotated in the direction of the arrow shown in Fig. 3, the major portion of the grain and straw threshed thereby is ejected rearward by the cylinder, either falling directly on the conveyer 11 or striking against the rear wall of the casing 8, and then falling upon the conveyer, while the relatively small percentage of grain falling through the concave is delivered to the conveyer 11 by the chute 10. Obviously, the straw rests upon the conveyer proper, while the grain falls therethrough upon the floor 13. As the conveyer then moves grainwardly, the straw is carried in that direction and up the inclined portion of the conveyer, being delivered over the end of the latter. The grain, on the other hand, while likewise fed grainwardly during the first stages of the conveyer movement, by the sliding action of the slats 12 over the floor 13, is delivered to the grain auger 32, as obviously is also any grain falling through the conveyer as the latter is moved toward the outer end of the inclined box 24, the coöperating floor extension 26 and the floor 35 acting to deliver this grain to the auger. As hereinabove pointed out, the auger 32 delivers the grain to the elevator 34, which then delivers it to the separator 36.

It is to be noted that by reason of this construction the machine is rendered very compact, the grain and straw carrier mechanism being carried directly in rear of the cylinder 7 and disposed transversely to the line of draft so that it is substantially within the outline of the frame. Attention is also directed to the compactness of this mechanism itself, the floors and grain auger being located between the runs of the conveyer. It is further to be noted that the necessary distance for the grain to travel is very small, the same being ejected directly from the threshing mechanism onto the carrier, which in turn delivers it directly to the grain auger and elevating mechanism.

It is obvious that in my improvement various types of conveyers may be used in lieu of the conveyer 11 illustrated herein or the grain auger 32, and that my invention may itself be used in connection with various other machines than those of the type illustrated and described in this application, the form of my invention described herein being used simply as an illustration disclosing the principle of the invention, which may be modified and embodied in various forms without departing from its spirit.

What I claim as my invention, and desire to secure by Letters Patent, is:

1. In a thresher, a thresher cylinder, a substantially horizontal floor disposed below and directly in the rear thereof, movable perforate conveyer mechanism slidable over said floor for carrying away the threshed grain and straw, and a grain conveyer receiving the grain from said mechanism at a point adjacent the edge of said floor.

2. In a thresher, a thresher cylinder a movable perforate grain and straw conveyer disposed directly in rear of said cylinder, a grain conveyer disposed beneath said perforate conveyer, and means located in the rear of the grain conveyer and coöperating with the perforate conveyer whereby the grain falling therethrough is delivered to said grain conveyer.

3. In a thresher, a frame, a thresher cylinder journaled thereon, a substantially horizontal floor carried on said frame directly in rear of said cylinder, an endless perforate conveyer movable over said floor transversely to the cylinder, and a grain conveyer disposed intermediate the runs of said conveyer receiving the grain dragged over the edge of said floor by said conveyer.

4. In a thresher, a frame, a grain conveyer thereon, an endless perforate grain and straw conveyer carried by said frame and having runs disposed on opposite sides of said grain conveyer, and floor members spaced from said perforate conveyer and extending laterally in opposite directions from said grain conveyer and between the runs of said grain and straw conveyer for receiving the grain directly from said perforate conveyer and conveying it to said grain conveyer.

5. In a thresher, a frame, threshing mechanism thereon, spaced transversely disposed U-shaped members carried on said frame in rear of said threshing mechanism, a transversely disposed floor bridging the space between said members, and a transversely movable perforate conveyer slidable over said floor.

6. In a thresher, a frame, threshing mechanism thereon, spaced transversely disposed U-shaped members carried on said frame in rear of said threshing mechanism, a transversely disposed floor bridging the space between said members, a rearwardly disposed chute located beneath said threshing mechanism, and a transversely movable endless perforate and slatted conveyer slidable over said floor.

7. In a thresher, a frame, a thresher cylinder thereon, a floor directly in rear of said cylinder, means slidable over said floor receiving the grain and straw acted upon by said cylinder and delivering the same laterally with respect thereto, a separator on said frame, a conveyer for conveying grain thereto, and means coöperating with said first mentioned means for separating the grain from the straw and delivering the same to said last mentioned conveyer after a predetermined movement of the same along said delivering means.

8. In a thresher, a frame, a thresher cylinder thereon, transversely disposed endless perforate straw and grain carrier mechanism disposed beneath and in rear of said cylinder and projecting laterally therefrom for delivering laterally the straw and grain threshed thereby, a floor disposed between the upper and lower runs of said endless carrier mechanism, and a grain conveyer carried between the upper and lower runs of said endless carrier mechanism and located intermediate the ends of said floor disposed in a direction at right angles to the direction of movement of said conveyer.

9. In a thresher, a frame, a grain conveyer thereon, an endless perforate grain and straw conveyer carried by said frame, and an imperforate floor extending upwardly and rearwardly between the runs of said grain and straw conveyer and spaced from said runs for receiving the grain directly from said perforate conveyer and conducting the same to said grain conveyer.

In testimony whereof I affix my signature in the presence of two witnesses.

REX B. HITCHCOCK.

Witnesses:
 BERT R. BENJAMIN,
 RAY D. LEE.

Copies of this patent may be obtained for five cents each, by addressing the "Commissioner of Patents, Washington, D. C."